(12) United States Patent
Diorio et al.

(10) Patent No.: US 10,049,317 B1
(45) Date of Patent: Aug. 14, 2018

(54) RFID TAGS WITH PUBLIC AND PRIVATE INVENTORY STATES

(71) Applicant: Impinj, Inc., Seattle, WA (US)

(72) Inventors: Christopher J. Diorio, Shoreline, WA (US); Joel Peshkin, San Juan Capistrano, CA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 15/690,597

(22) Filed: Aug. 30, 2017

Related U.S. Application Data

(63) Continuation of application No. 13/854,580, filed on Apr. 1, 2013, which is a continuation of application No. 12/697,895, filed on Feb. 1, 2010.

(51) Int. Cl.
   *G06K 19/07* (2006.01)
(52) U.S. Cl.
   CPC .................. *G06K 19/0723* (2013.01)
(58) Field of Classification Search
   CPC ............ G06K 7/0008; G06K 7/10297; G06K 7/10019; G06K 7/10108; G06K 2017/0051; G06K 7/10198; G06K 19/0723; G06Q 10/087; G06Q 10/08; H04Q 9/00; H04Q 2209/883
   See application file for complete search history.

(56) References Cited

U.S. PATENT DOCUMENTS

| 5,673,037 | A | 9/1997 | Cesar et al. |
| 6,992,567 | B2 | 1/2006 | Cole et al. |
| 7,053,754 | B2 | 5/2006 | Mani |
| 7,088,246 | B2 | 8/2006 | Fukuoka |
| 2004/0046642 | A1* | 3/2004 | Becker ............... G01V 15/00 340/10.32 |
| 2005/0057341 | A1 | 3/2005 | Roesner |
| 2005/0253687 | A1* | 11/2005 | Martinez ............ G06K 7/0008 340/10.2 |
| 2005/0263591 | A1 | 12/2005 | Smith |
| 2006/0145817 | A1 | 7/2006 | Aikawa et al. |
| 2006/0187031 | A1 | 8/2006 | Moretti et al. |

(Continued)

OTHER PUBLICATIONS

Office Action received for U.S. Appl. No. 12/697,895, dated Sep. 14, 2012 and filed on Feb. 1, 2010.

(Continued)

*Primary Examiner* — Nay Tun
(74) *Attorney, Agent, or Firm* — Turk IP Law, LLC

(57) ABSTRACT

RFID tags capable of transitioning between a private state and one or more public states are provided. In the private state, tags may participate in an inventory round without restriction. In a public state, tags may be prevented from participating in an inventory round, allowed to participate without providing actual identifying information, or allowed to participate providing an alternate identifier. Whether and how the tag responds in public state may depend on certain conditions including if one or more of the tag's flags are asserted or deasserted. Readers may select a public tag for inventorying by providing sufficient information to the tag to verify the reader's authenticity, and the tag then asserting or deasserting one or more of its flags accordingly. The asserted or deasserted flag(s) may be used to determine whether and how a tag in public state participates in an inventory round.

20 Claims, 14 Drawing Sheets

(56) References Cited

U.S. PATENT DOCUMENTS

| | | |
|---|---|---|
| 2007/0046432 A1 | 3/2007 | Aiouaz et al. |
| 2007/0069863 A1 | 3/2007 | Akiyama et al. |
| 2007/0176751 A1 | 8/2007 | Cesar et al. |
| 2008/0018431 A1 | 1/2008 | Turner et al. |
| 2008/0129447 A1 | 6/2008 | Choi et al. |
| 2008/0212360 A1 | 9/2008 | Rizzo et al. |
| 2009/0315685 A1* | 12/2009 | Bauchot ............... G01S 5/0289 340/10.41 |
| 2010/0148933 A1* | 6/2010 | Dacus ................ G06K 7/0008 340/10.3 |

OTHER PUBLICATIONS

EPCTM Radio-Frequency Identity Protocols Class-1 Generation-2 UHF RFID Protocol for communications at 860 MHz—960 MHz Version 1.1.0, pp. 37-57 and pp. 78-85, Dec. 17, 2005.

\* cited by examiner

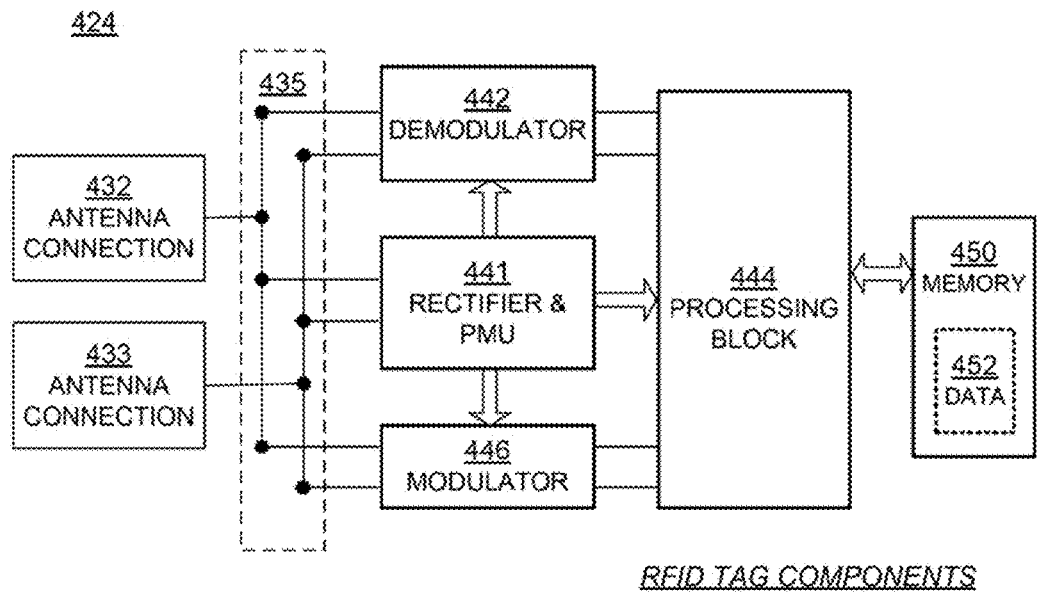
FIG. 4
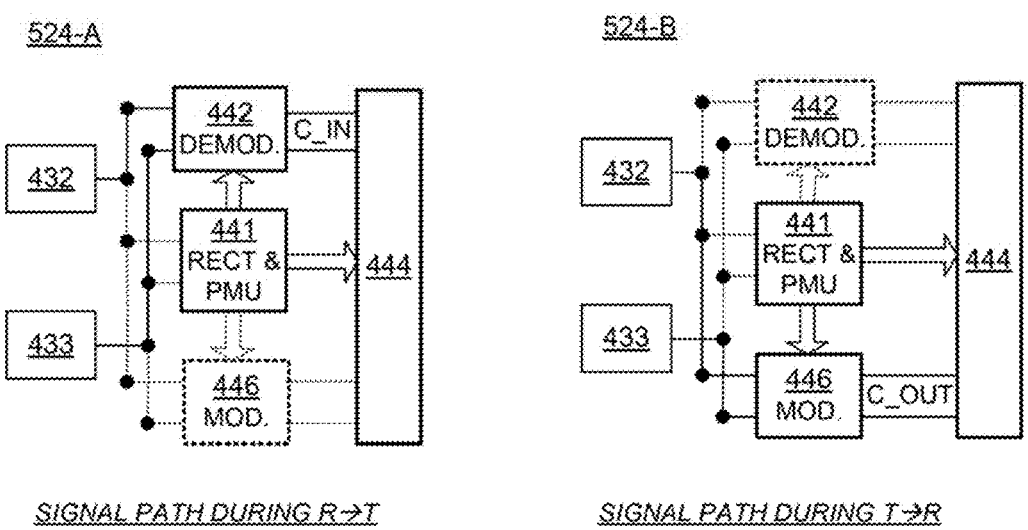
FIG. 5A  FIG. 5B

RFID TAGS WITH PUBLIC AND PRIVATE INVENTORY STATES

CROSS REFERENCE TO RELATED APPLICATIONS

This Application is a continuation under 35 U.S.C. § 120 of co-pending U.S. patent application Ser. No. 13/854,580 filed on Apr. 1, 2013, which is a continuation under 35 U.S.C. § 120 of U.S. patent application Ser. No. 12/697,895 filed on Feb. 1, 2010. The U.S. Patent Applications are hereby incorporated by reference in their entireties.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

In some circumstances tagged items have their tags removed, such as at point-of-sale for tagged retail items or when an item is removed from tagged packaging and the packaging is destroyed. In other circumstances tagged items retain their tags for specific or future uses such as retail-item returns to a store or tagged identity cards. In some cases, especially when the tag is retained on the item, the owner of the tagged item may not want unauthorized readers to be able to read or track the item, such as for privacy reasons. Most conventional tags are always capable of being inventoried; those that inhibit regular inventory typically require a password-based challenge-response authentication with a reader before allowing themselves to be inventoried. The former tag types pose privacy risks to their owners; the latter tag types require complex password-based authentication that adds complexity to the reader and to the tag and makes it difficult to use the tags unless the interrogating reader has knowledge of both the authentication algorithm and the tag's secret password.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to RFID tags capable of transitioning between a private state and one or more public states. In the private state, a tag may participate in an inventory round without restriction. In the public state or states the tag may be prevented from participating in an inventory round, allowed to participate in an inventory round but prevented from providing actual identifying information, or allowed to participate in the inventory round. Whether and how the tag responds in the public state may depend on certain conditions, such as if one or more of the tag's flags are asserted or deasserted. Embodiments are directed to tags being first selected in the public state for inventorying by receiving sufficient information to verify that the reader is authentic or genuine, and the tag then asserting or deasserting one or more of its flags accordingly. Embodiments are further directed to the asserted or deasserted flag or flags being those flags that determine whether and how a tag in the public state participates in an inventory round. According to further embodiments, a tag in the public state or states that is prevented from providing an actual identifier may respond to a reader with an alternative identifier in place of the tag's actual identifier.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 4 is a block diagram showing a detail of an RFID tag, such as the one shown in FIG. 1.

FIGS. 5A and 5B illustrate signal paths during tag-to-reader and reader-to-tag communications in the block diagram of FIG. 4.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
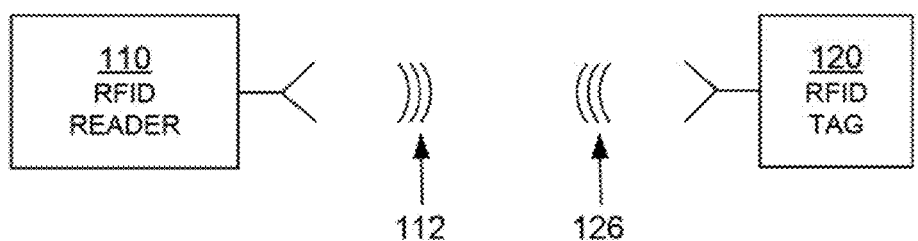
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 typically includes an antenna system, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Tag 120 can be a passive tag, or an active or battery-assisted tag. Where tag 120 is a passive tag, it is powered from wave 112.

Figure 2:
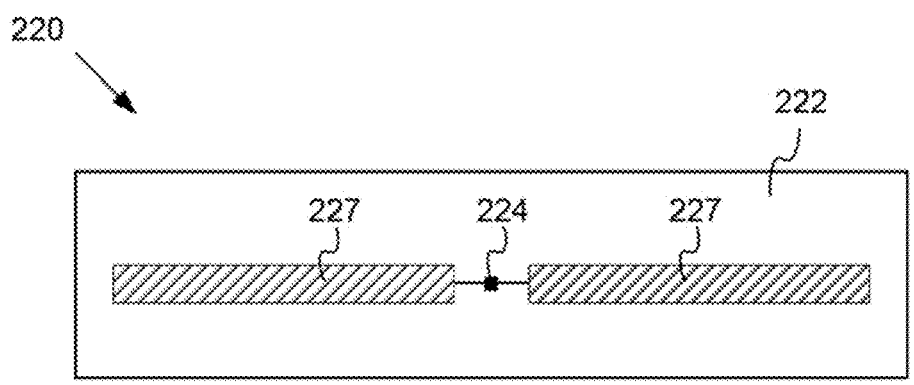
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is formed on a substantially planar inlay 222, which can be made in many ways known in the art. Tag 220 includes an electrical circuit which is preferably implemented as an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna terminals (not shown in FIG. 2).

The antenna may be made in a number of ways, as discussed in more detail below. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna terminals of IC 224. For example, the antenna can form a single loop, with its ends coupled to the terminals. It should be remembered that, when the single segment has more complex shapes, even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
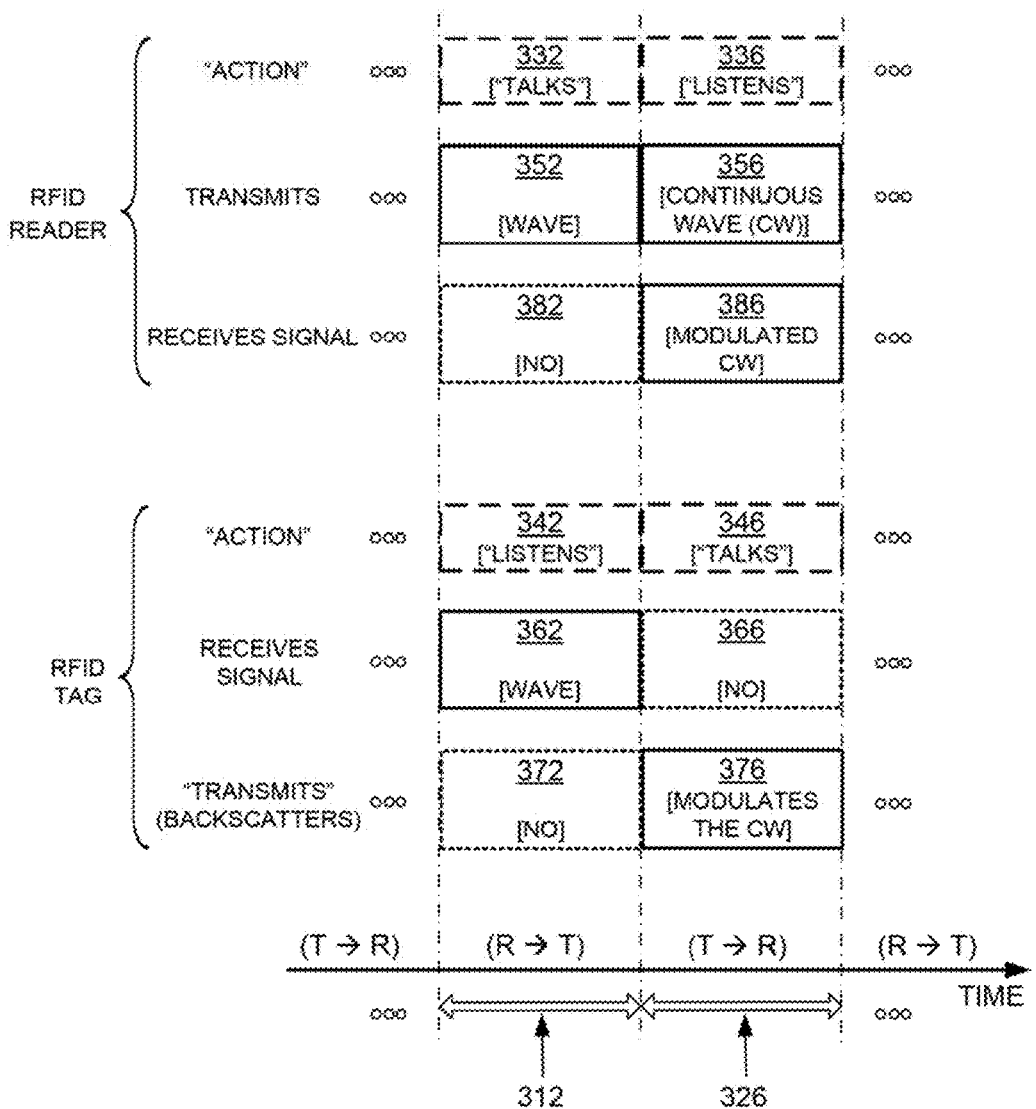
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna terminals 432, 433, which are suitable for coupling to one or more antenna segments (not shown in FIG. 4). Antenna terminals 432, 433 may be made in any suitable way, such as using pads and so on. In a number of embodiments more than two antenna terminals are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier (RECT) and PMU (Power Management Unit) 441. Rectifier and PMU 441 may be implemented in any way known in the art, for harvesting raw RF energy received via antenna terminals 432, 433. In some embodiments, block 441 may include more than one rectifier.

In operation, an RF wave received via antenna terminals 432, 433 is received by Rectifier and PMU 441, which in turn generates power for the electrical circuits of IC 424. This is true for either or both reader-to-tag (R→T) and tag-to-reader (T→R) sessions, whether or not the received RF wave is modulated.

Circuit 424 additionally includes a demodulator 442. Demodulator 442 demodulates an RF signal received via antenna terminals 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna terminals 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session (receive mode of operation) during time interval 312 of FIG. 3. An RF wave is received by antenna terminals 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R→T session. Indeed, Rectifier and PMU 441 may be active, but only in converting raw RF power. And modulator 446 generally does not transmit during a R→T session. Modulator 446 typically does not interact with the received RF wave significantly, either because switching action in section 435 of FIG. 4 decouples the modulator 446 from the RF wave, or by designing modulator 446 to have a suitable impedance, and so on.

While modulator 446 is typically inactive during a R→T session, it need not be always the case. For example, during a R→T session, modulator 446 could be active in other ways such as adjusting its own parameters for operation in a future session.

FIG. 5B shows version 524-B of components of circuit 424 of FIG. 4, further modified to emphasize a signal operation during a T→R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna terminals 432, 433.

Version 524-B shows as relatively obscured those components that do not play a part in processing a signal during a T→R session. Indeed, Rectifier and PMU 441 may be active, but only in converting raw RF power. And demodulator 442 generally does not receive during a T→R session. Demodulator 442 typically does not interact with the transmitted RF wave, either because switching action in section 435 decouples the demodulator 442 from the RF wave, or by designing demodulator 442 to have a suitable impedance, and so on.

While demodulator 442 is typically inactive during a T→R session, it need not be always the case. For example, during a T→R session, demodulator 442 could be active in other ways such as adjusting its own parameters for operation in a future session.

Figure 6:
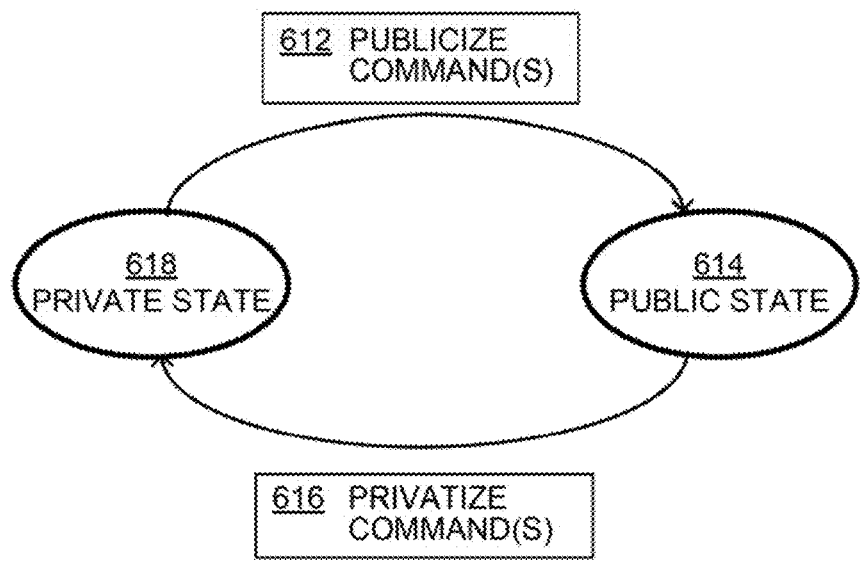
FIG. 6 illustrates how a tag can be switched between a public state and private state according to embodiments.

FIG. 6 illustrates how a tag can be switched between public and private states and back again, according to embodiments.

Normal RFID inventory operations permit a reader to determine, at least, the identity of a tag in its field-of-view unless the reader specifically and selectively takes action to exclude the tag from the inventorying. This ubiquitous inventory capability has the benefit of allowing a reader to identify all tags in its field of view, but has the disadvantage of permitting anyone to scan a tagged item and then locate it again later, raising privacy concerns and potentially providing useful information to thieves.

Figure 9:
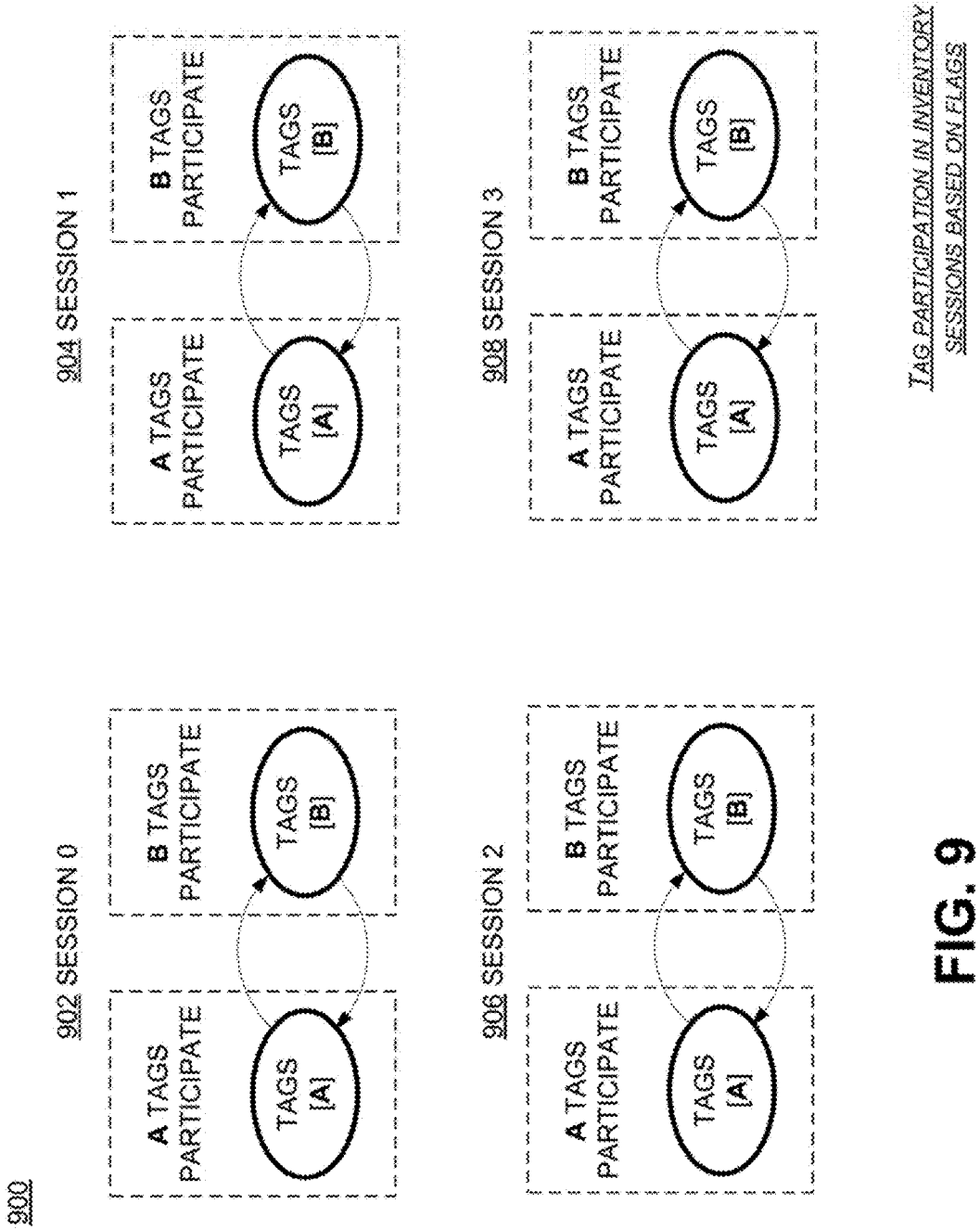
FIG. 9 illustrates how tags participate in inventory rounds according to the Gen2 Specification.

The mechanism by which a reader selectively inventories one or more tags while excluding other tags from the inventorying is called "selection". A reader selects one or more tags for inventorying while deselecting others. In the Gen2 Specification (Generation-2 UHF RFID Protocol for Communications version 1.2.0 by EPCglobal Inc. Standards Committee) the selection process employs a single command, Select, which a reader may apply successively to select a particular tag population, based on user-defined criteria, enabling union (U), intersection (∩), and negation (~) based tag partitioning. Readers perform ∩ and U operations by issuing successive Select commands. Select can assert or deassert a tag's SL flag, or it can set a tag's session flag to either A or B in any one of four sessions as discussed in more detail below (FIG. 9 and FIG. 10 and associated description). In the Gen2 Specification, a reader then issues a Query command to perform an inventory operation. The Query always specifies a session and a session flag value (A or B) in that session; it also optionally uses the SL flag. Readers may inventory SL or ~SL tags, or they may choose to not use the SL flag at all. The tag replying to the Query with an actual identifier is said to be "inventoried".

As mentioned previously, embodiments are directed to RFID tags and tag chips with the ability to transition between states (i.e. public and private states) and to adjust their responses to readers depending on their state and their flag value(s). In certain states a tag will not respond to a reader or will not provide an actual identifier to the reader unless the reader has first provided information indicating that the reader is authorized to interact with the tag(s). In some embodiments the reader provides this information using a Select command.

As shown in diagram 600, a tag according to some embodiments may be capable of being in one of two states: a public state 614 and a private state 618. In public state 614 the tag may act more carefully because it is in "public" and so it may restrict the information it provides to a reader or may not respond at all until the reader has proven itself to be an authorized reader (i.e. the reader has authenticated itself). In some circumstances the tag may reply with a partial or scrambled identifier until the reader authenticates itself, after which the tag will provide an actual identifier. The actual identifier is a quantity that identifies the tag, the item to which the tag is attached, or the holder of the tag. Actual identifiers can be a numeric or alphanumeric EPC, TID, password, code, secret, memory content, or similar.

In private state 618, the tag may act less carefully, because it is in a private location where a rogue reader is not expected to be operating. In this case the tag may operate "normally" and participate in inventory rounds without restriction, providing the information requested by the reader such as its actual identifier, or any other information stored in tag memory.

The tag may transition between public state 614 and private state 618 and back again in response to privatize command(s) 616 and publicize command(s) 612, respectively, received from a reader. The privatize command(s) 616 and publicize command(s) 612 may be custom commands, custom Select commands, or a Write command writing data into a tag memory location. In some embodiments the privatize command and the publicize command are one and the same, in which case the single command may include one or more fields that instruct the tag to privatize itself or publicize itself. Regardless of whether the privatize and publicize commands are combined or separate, they may contain additional information such as a password, an indicator for which public state the tag should choose from a plurality of public states, and perhaps perform other operations as well. According to some embodiments the tag may transition states in response to a reader command only if the reader has first proven itself to be genuine, such as by providing a proper password.

Figure 7:
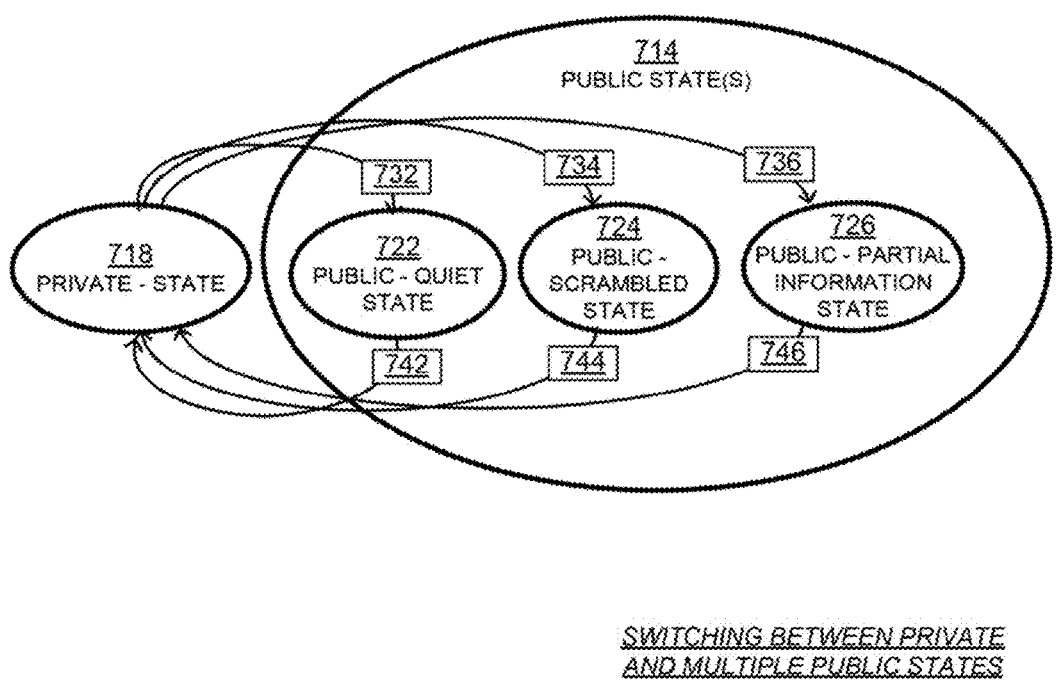
FIG. 7 illustrates how a tag can be switched from a private state to a plurality of public states and back according to embodiments.

FIG. 7 illustrates how a tag can be switched from a private state to one of a plurality of public states and back again according to embodiments.

As shown in diagram 700, a tag may have access to more than one public state. The different public states may alter the information a tag provides to a reader, as well as alter how the tag operates. For example, for an unauthorized reader a tag may remain silent in a first public state, provide a random or scrambled or encrypted identifier in a second public state, provide only partial information in a third public state, and so on. The tag will typically provide full and complete information to the reader once the reader is authenticated, but in some embodiments the reader may still have limited access to some tag memory contents depending on the tag state.

To authenticate itself, a reader may send to the tag some information about the tag indicating that the reader "knows' which tag it is speaking with. The reader may choose to send this authenticating information in a Select command that precedes an inventory operation. Alternatively, the reader may use a custom command to provide the tag with authenticating information. The information (also referred to as a string or code) may be a part or all of the EPC memory, a part or all of TID memory, a part or all of User memory, or optionally a part of Reserved memory. The tag may have rules about how much information it deems sufficient for a reader to be authenticated. These rules may be built into the tag or defined during tag programming, when the tag is interrogated by a prior reader, or by any other means. Once authenticated, the tag may respond within an inventory round just like any tag that does not implement the public/private capability.

Diagram 700 illustrates an example set of public states that may be used by an RFID tag. Private state 718 is similar to private state 618 described in FIG. 6, where a tag may freely participate in an inventory round (regardless of or based on its flags) and provide its identifier and other information to an interrogating reader. In public-quiet state 722, the tag may not respond to an interrogating reader that has not yet authenticated itself. In public-scrambled state 724, the tag may provide a random or scrambled response to an interrogating reader that has not yet authenticated itself. In public-partial information state 726, the tag may provide only partial identifying information in response to an interrogating reader that has not yet authenticated itself.

Transitioning from private state 718 to public states 722, 724, and 726 may be caused by respective reader commands 732, 734, and 736. Similarly, transitioning from public states 722, 724, and 726, to private state 718 may be in response to respective reader commands 742, 744, and 746.

Figure 8:
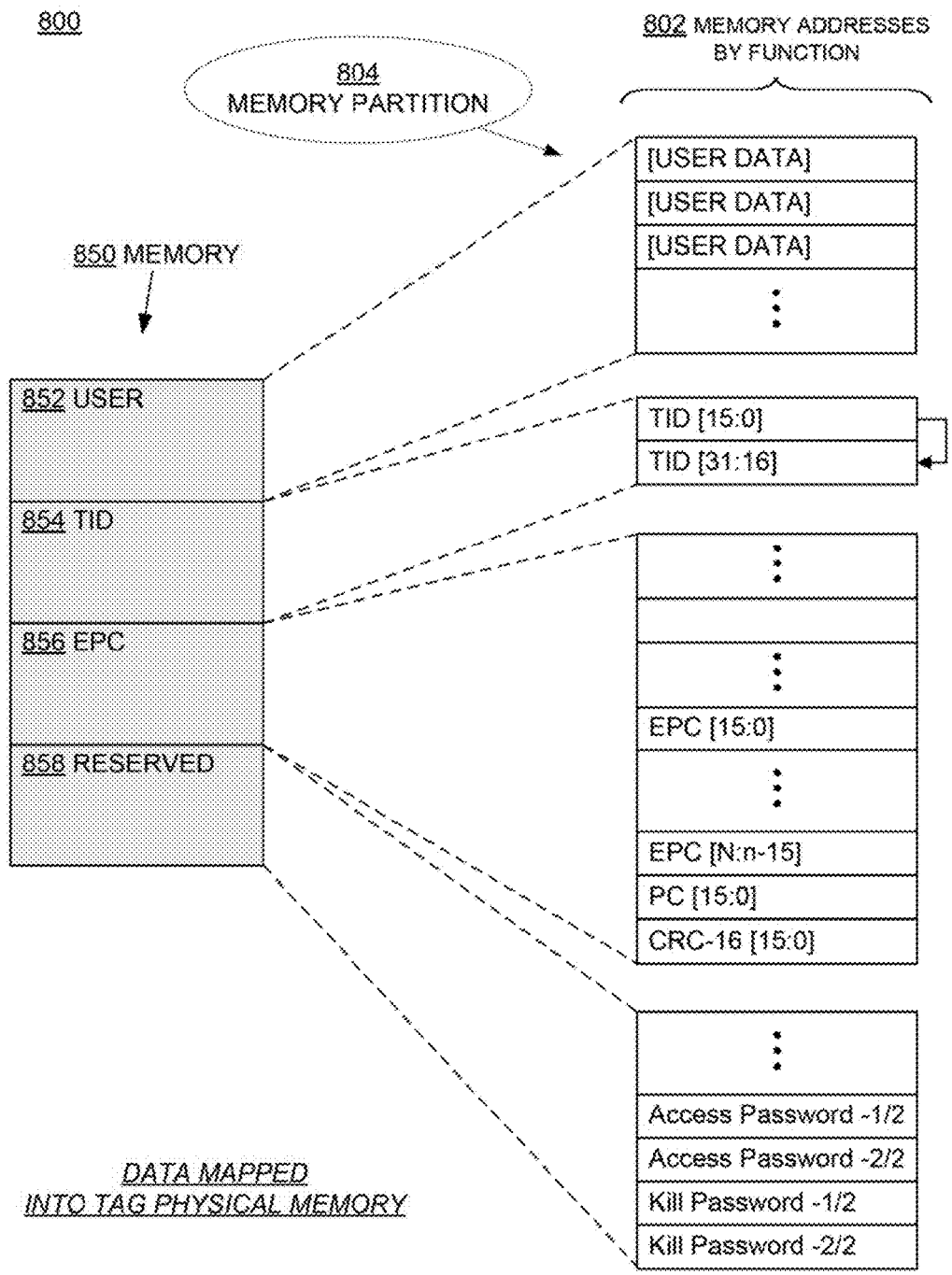
FIG. 8 is a diagram illustrating how a tag physical memory such as the memory shown in FIG. 4 can be partitioned and organized.

FIG. 8 is a diagram 800 illustrating how a tag physical memory such as the memory shown in FIG. 4 can be partitioned and organized for data, such as one or more tag identifiers, to be stored into it.

Tag memory 850 may be partitioned logically. The data stored in memory partitions 804 may include user data in partition 852, an identifier for the tag itself (a TID) in partition 854, an identifier associated with an item to which the tag is attached (often an electronic product code—an EPC) in partition 856, and information such as passwords that are reserved for the tag itself in partition 858. In other embodiments, memory 850 may be partitioned in other ways with fewer or more partitions, or not partitioned at all. Data may be stored in the memory during tag manufacturing or during an operation by processing block 444 of FIG. 4, typically in response to a command received from a reader. Processing block 444 may also access the stored information.

Information stored in memory 850 may be used in tag operations. For example, EPC partition 856 can be arranged to store a CRC-16 (cyclic redundancy check) for the EPC code, protocol control (PC) information that identifies parameters of the EPC code, and the EPC code itself. The tag may provide information stored in its memory, such as the EPC, in response to a Query command if the tag state and flag conditions are satisfied as discussed in more detail below.

FIG. 9 illustrates how tags participate in inventory rounds according to the Gen2 Specification.

In an RFID system according to Gen2 Specification, a reader performs an inventory round in one of four sessions 902 (session 0 or S0), 904 (session 1 or S1), 906 (session 2 or S2), and 908 (session 3 or S3) with associated session flags. Tags participate in only one session during the round. Tags maintain a session flag (S0, S1 S2, and S3) for each session. Each of the session flags may have one of two values, A or B. For clarity, we will use the terms "asserted" and "deasserted" to describe the states of a flag, rather than A or B, regardless of whether the flag is a session flag, a selected (SL) flag, or another flag. Note that the choice of flag polarity is immaterial—assigning A to asserted and B to deasserted is just acceptable as assigning A to deasserted and B to asserted—as long as an RFID system uses the assignment polarities consistently.

At the beginning of each inventory round a reader may choose to inventory either asserted (A) or deasserted (B) tags in one of the sessions. Tags participating in an inventory round in one session do not use or modify the session flag for a different session. The session flags are a resource a tag provides separately and independently to a given session. The Query command that a reader uses to inventory tags contains a field to specify the session (S0, S1, S2, or S3) as well as the polarity (asserted or deasserted) that the session flag must have for the tag to participate in the inventory round.

A tag according to the Gen2 Specification also implements a selected flag, SL, which a reader may assert or deassert using a Select command. A Sel parameter in a Query command allows the reader to inventory tags that have SL either asserted or deasserted (i.e. SL or ~SL), or to ignore the flag and inventory tags regardless of their SL value. SL is not associated with any particular session, may be used in any session, and is common to all sessions.

Thus, a tag according to embodiments may employ one or more flags that determine whether the tag will participate or not participate in an inventory round. The flags may include S0, S1, S2, S3, SL, and optionally a custom flag. A reader may cause a tag to assert or deassert one or more of the S0, S1, S2, S3, SL, or custom flags using a Select command of the Gen2 Specification, a custom command, or a memory write. For example, a tag receiving a Select command may assert or deassert one of S0, S1, S2, S3, or SL if a string in the Select command matches or mismatches a memory on the tag.

The Select command may assert a deasserted flag, or deassert an asserted flag, based on a match or mismatch between the string sent in the Select command and a value in tag memory. As described above, when a tag according to embodiments is in the public state, the tag may have different rules for the Select command than when the tag is in the private state. For example, in the public state the tag may enforce a minimum string length for matching without which the tag will not modify a flag value; the tag may decline to modify a flag value based on a mismatch, and so on.

According to an example scenario, a reader asserts one of the flags (say, S1) for a tag in the public state by sending a Select command with a string that matches a memory portion on the tag. The reader thereby indicates that it knows something about the tag, and if the tag deems this information to be sufficient, it asserts the S1 flag. The sent string is the mechanism by which the tag authenticates the reader. This mechanism helps ensure that the reader is not a rogue by the reader proving that it already knows something about the tag. In general, the more bits the tag requires in the sent string the less likely a rogue reader can guess the string. The reader then queries tags with an asserted S1 flag, and the tag responds with its actual identifier. Absent the flag being asserted, the tag would not normally respond.

To enhance security, a tag whose flag was asserted by an authentic reader is not desired to later respond to another, unauthenticated reader. Consequently, it is important that the tag deassert its flag after it has finished its dialog with the reader. In some embodiments the authenticated reader may reset the flag to its deasserted value when the reader has concluded its dialog with the tag. In other embodiments the tag flags may be constructed to decay, after a period of time, to the deasserted state. This decay ensures that a tag whose flag was asserted may, after the decay time, be no longer responsive to a reader unless the reader again authenticates itself and reasserts the flag. In this latter fashion the tag can be made to be fail-safe, such that if a reader forgets to deassert the flag the tag may deassert it itself after a decay time.

FIG. 10A through 10D illustrate example tag behaviors based on flag values and tag states according to various embodiments.

Figure 10A:
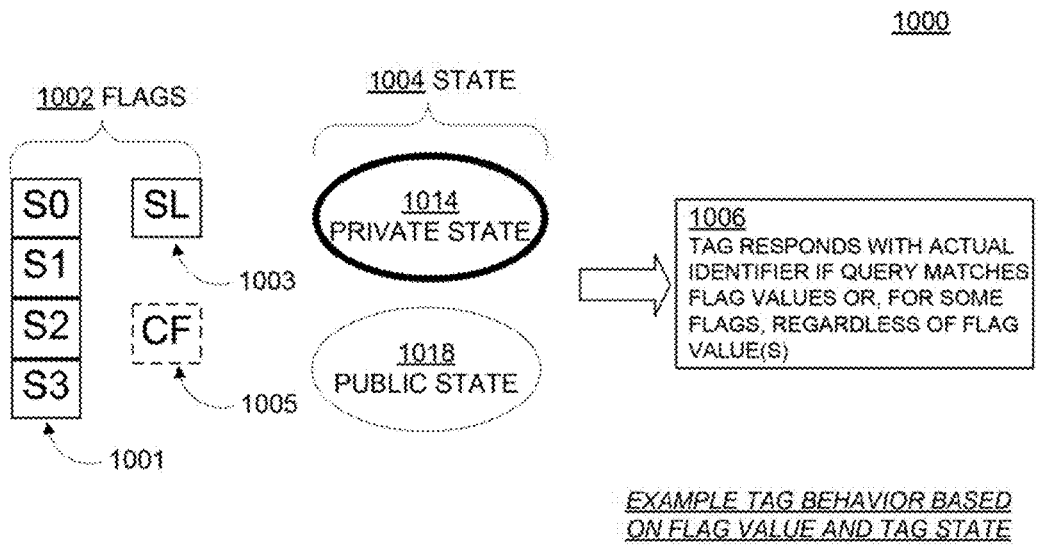
FIG. 10A through 10D illustrate example tag behaviors based on flag values and tag state according to various embodiments.

As shown in diagram 1000 of FIG. 10A, a tag may have a plurality of flags 1002 including a bank of session flags 1001, SL flag 1003, and an optional custom flag (CF) 1005. One or more of these flags may be asserted or deasserted as discussed above. The tag will also have a state 1004, which according to embodiments can be public or private. The flag values 1002 and the tag state 1004 determine a behavior of the tag in its interactions with a reader.

In an inventory round, a reader may Query the tag specifying one of S0, S1, S2, S3, and for this one flag the reader specifies whether it wants tags with flag values of A or B (asserted or deasserted) to respond. The reader may also specify SL, ~SL, or don't care for the SL flag. Custom flags may be employed in a manner similar or different from the above-described behavior. When in the private state 1014, the tag may respond according to Gen2 Specification (i.e. participate in the round if its flag value matches the Query command).

FIG. 10A illustrates example tag behavior in private state 1014. In state 1014 a tag behaves in one of four ways (1006): (1) if a particular flag is asserted and a reader queries tags with that flag asserted then the tag responds with its actual identifier; (2) if a particular flag is deasserted and a reader queries tags with that flag deasserted then the tag responds with its actual identifier; (3) if a reader queries tags irrespective of a flag value then the tag responds with its actual identifier, or (4) regardless of the foregoing, if any of the flags specified in the Query command are mismatched from the actual tag values then the tag will not respond. Of course, a combination of the session flags 1001, SL flag 1003, and or the custom flag 1003 may be specified and used in determining whether the tag participates in an inventory round.

Figure 10B:
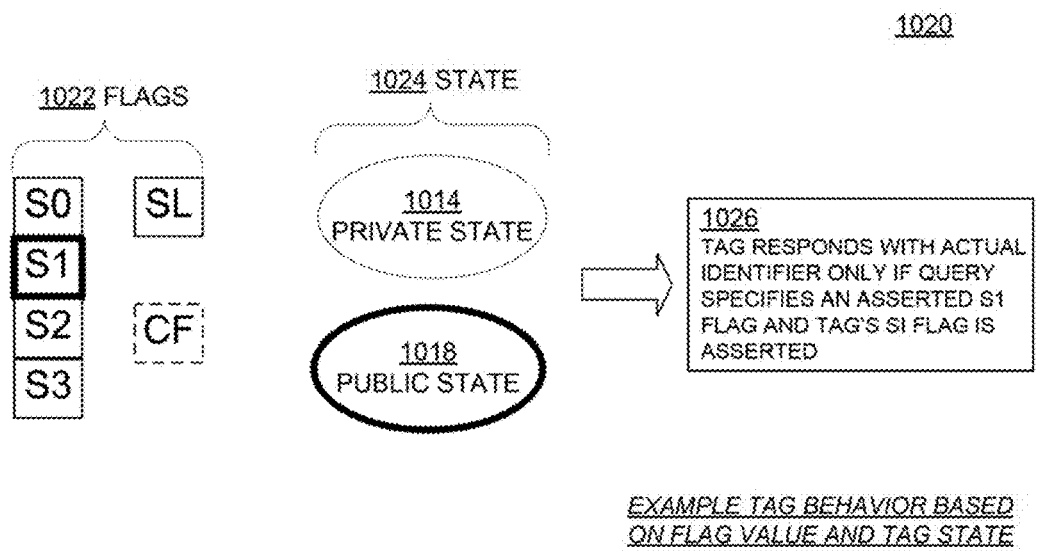
Figure 10C:
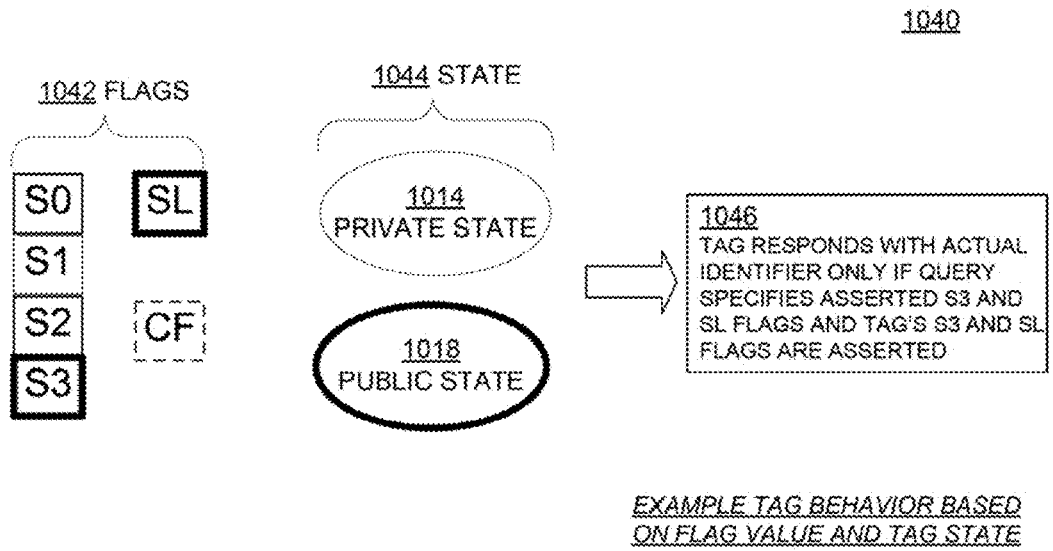
Figure 10D:
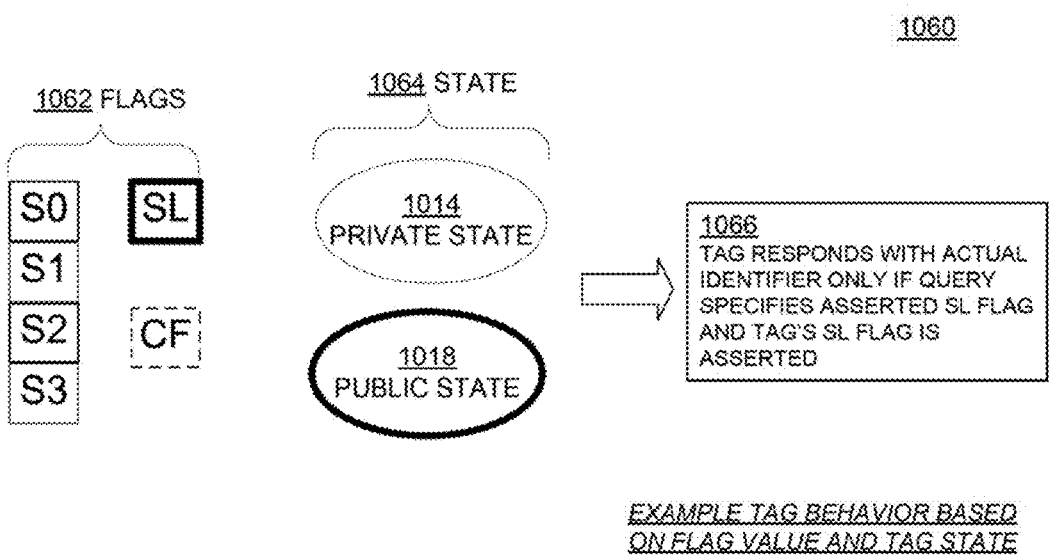

FIG. 10B through 10D illustrate example tag behavior in public state 1018, where one or more of the flags (bolded), chosen by the reader via its Query command, are used in conjunction with the public tag state as a "security gate" to determine the tag behavior for the inventory round. When in public state 1018 the tag may behave in one of the following three ways: (1) if a flag is asserted and the reader queries tags with that flag asserted then the tag responds with its actual identifier; (2) if a flag is deasserted and the reader queries tags with that flag deasserted and the Query does not also specify a matching asserted flag then the tag may remain silent or may respond with scrambled, partial, or random (such as an RN16 of the Gen2 Specification) information, and (3) regardless of the foregoing, if any of the flags specified in the Query command are mismatched from the actual tag values then the tag will not respond. In the present example, to maintain the "security gate", if the reader queries tags with more than one flag specified in the Query command then at least one of these flags must be asserted in the Query command and likewise asserted on the tag in order for the tag to respond with its actual identifier.

In the example scenario of diagram 1020 of FIG. 10B, session flag S1 of tag flags 1022 is asserted and tag state 1024 is public state 1018. The tag responds with its actual identifier only if the Query command specifies an asserted S1 flag.

In the example scenario of diagram 1040 of FIG. 10C, session flag S3 and selected flat SL of tag flags 1042 are asserted and tag state 1044 is public state 1018. The tag responds with its actual identifier only if the Query command specifies asserted S1 and SL flags.

In the example scenario of diagram 1060 of FIG. 10D, selected flag SL of tag flags 1062 is asserted and tag state 1064 is public state 1018. The tag responds with its actual identifier only if the Query command specifies an asserted SL flag.

Figure 11:
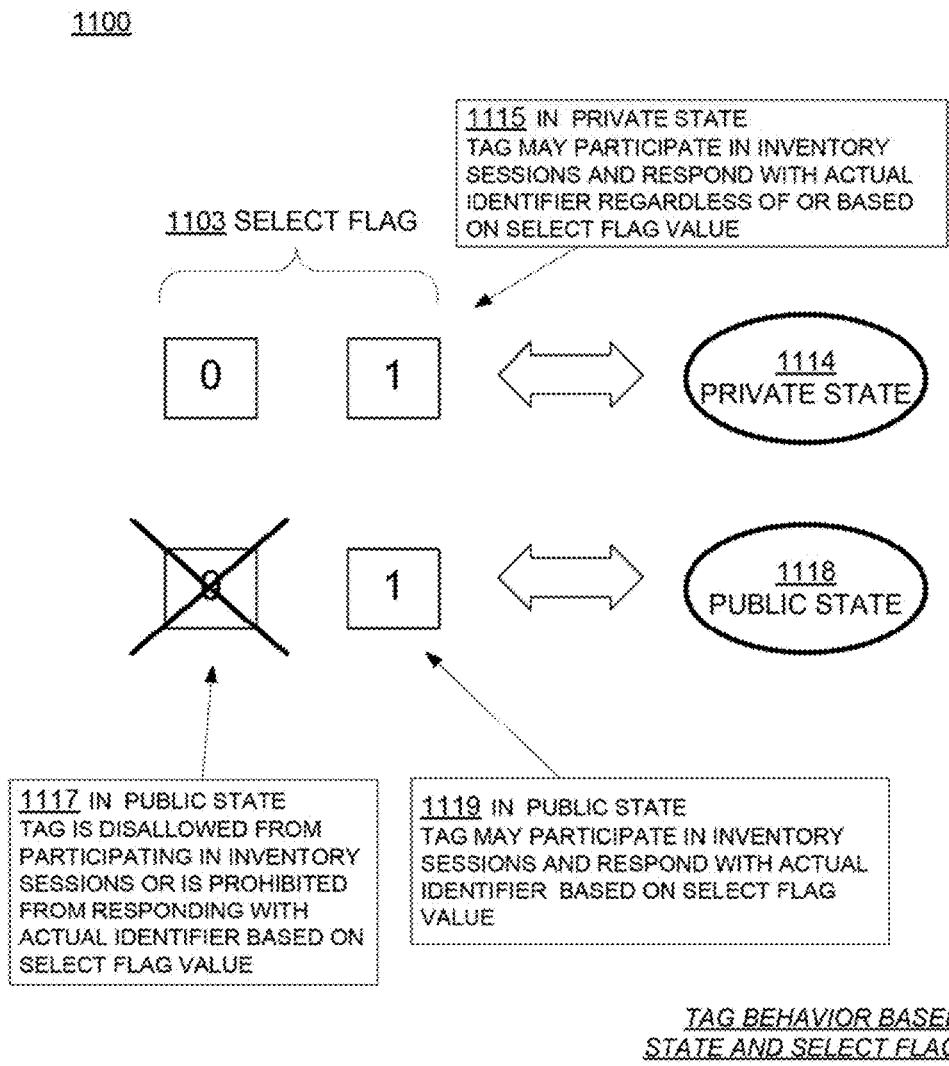
FIG. 11 illustrates an example of how select flag value and tag state result in tag participation or non-participation in inventory rounds and/or whether the tag responds with its actual identifier according to an example embodiment.

FIG. 11 illustrates how tag state and select flag value result in tag participation or non-participation in inventory rounds according to an example embodiment.

Diagram 1100 is a detailed illustration of the example scenario of FIG. 10D. According to a first example, when a tag is in private state 1114 it may participate in inventory rounds and responds with its actual identifier based on or regardless of the value of its select flag 1103 as indicate by reference numeral 1115. If a reader queries tags with an asserted or deasserted select flag, the tag may participate if and only if its actual select flag value matches that specified in the Query command. If the reader queries tags without specifying a select-flag value then the tag may respond regardless of its actual select-flag value.

The second example assumes that none of the S0, S1, S2, S3, or CF flags are asserted and acting as a "security gate" for the tag. According to this second example, when a tag is in public state 1118 and its select flag is deasserted (i.e. "0") it is either prevented from participating in an inventory round or prevented from participating with its actual identifier, as indicated by reference numeral 1117. If a reader queries tags with deasserted select flags then the tag will either not respond or will respond with partial or scrambled information. If the reader queries tags with asserted select flags the tag will not respond.

According to a third example, when a tag is in public state 1118 and its select flag is asserted (i.e. "1") it may participate in an inventory round, as indicated by reference numeral 1119. If a reader queries tags with asserted select flags then the tag may respond with its actual identifier.

Whereas a conventional tag participates in an inventory round if a reader queries tags with matching flags, a tag according to the present invention exhibits state-dependent behavior. When in the private state, it participates according to the rules of a conventional tag. When in the public state, it participates only if a reader first asserts a flag, and it enforces conditions on the reader attempting to perform the asserting. Specifically, the tag requires that the reader provide sufficiently detailed information about the tag that the tag can verify that the reader is authentic. Rogue readers will not have this information and will either be unaware that the tag is present, or will receive scrambled or random information so as to make the tag unrecognizable and untraceable, thereby protecting the privacy of the tag owner.

Figure 12:
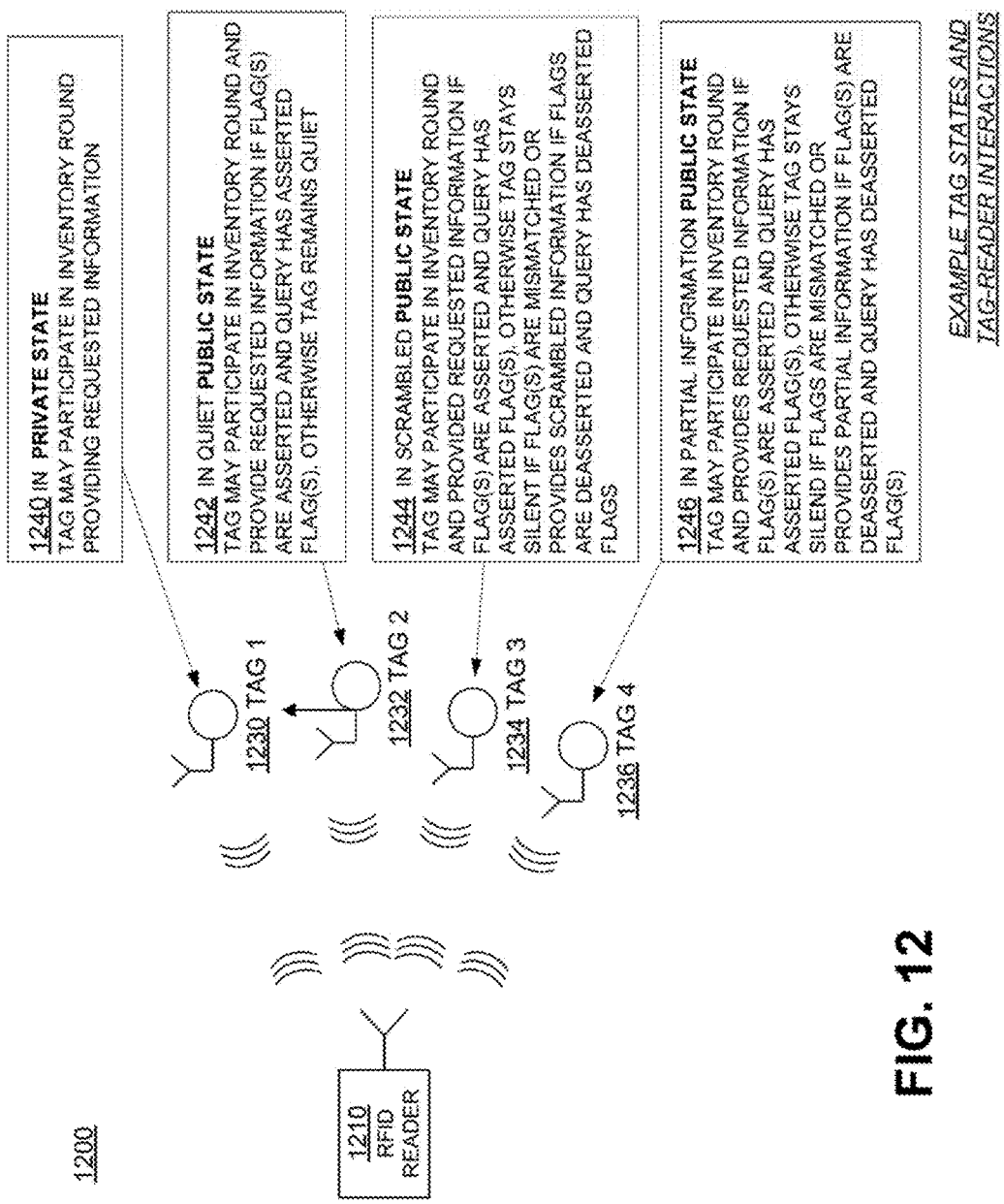
FIG. 12 illustrates example tag state and tag-reader interactions according to some embodiments.

Diagram 1200 of FIG. 12 illustrates example tag states and tag-reader interactions according to some embodiments.

According to the first example scenario 1240, tag 1230 is in a private state and participates in inventory rounds providing its actual identifier (e.g. actual EPC, actual TID, or other memory contents) to reader 1210 if its flag values match those specified in a Query command issued by the reader. Otherwise the tag remains silent.

According to the second example scenario 1242, tag 1232 is in a quiet public state in which the tag participates in an inventory round and provides an actual identifier only if one or more of its flags are asserted and its flag values match those specified in a Query command issued by the reader. Otherwise the tag remains silent.

According to the third example scenario 1244, tag 1234 is in a scrambled public state in which the tag participates in an inventory round and provides an actual identifier only if one or more of its flags are asserted and its flag values match those specified in a Query command issued by the reader. If the tag flags are asserted but the Query specifies these same flags deasserted then the tag does not respond. If the tag flags are deasserted and the Query specifies these same flags deasserted then the tag replies with scrambled, random, encrypted, or otherwise garbled information.

According to the fourth example scenario 1246, tag 1236 is in a partial-information public state, in which the tag participates in an inventory round and provides an actual identifier only if one or more of its flags are asserted and its flag values match those specified in a Query command issued by the reader. If the tag flags are asserted but the Query specifies these same flags deasserted then the tag does not respond. If the tag flags are deasserted and the Query specifies these same flags deasserted then the tag replies with partial information.

According to an example application, customers in public environments such as a retail store may not want their possessions participating in inventories for privacy reasons, but they may still wish to be able to return items that they have previously purchased from the retail store. At checkout, a code derivable from transaction data (possibly printed on a receipt) may be written to tag memory and the tag publicized to require receiving that code from a reader before participating in future inventories. A rogue reader will not know the code and will not be able to interrogate the tag. A returns desk at the retail store will know the code either from the receipt or from information provided by the customer and will be able to provide the code to the tag via a Select command, assert a tag flag, inventory the tag, accept the return, remove the code, privatize the tag, and place the item back on the retail shelf.

The states, flags, commands, choice of values (asserted versus deasserted) and configurations described above are for illustration purposes only and do not constitute a limitation on embodiments. Additional states, flags, commands, and configurations may be used to define tag behavior using the principles described herein.

A method for an RFID tag capable of being in one of a private state and a public state according to embodiments includes rendering the tag capable of participating in an inventory round with the reader regardless of a flag value (changeable by the RFID reader prior to the tag being inventoried) in the private state and rendering the tag capable of participating in an inventory round with the reader if the flag has a first value in the public state. Also in the public state, the method may include preventing the tag from participating in an inventory round with the reader or preventing the tag from providing an actual identifier to the reader if the flag has a second value.

The method may further include transitioning from one of the public and private states to the other state in response to a command from the reader. The command may be a custom command, a custom select command, or a write command. The tag may only execute the command if the communications satisfy a condition, the condition including the tag being in close proximity to the reader, the tag being first provided with a valid password, and/or the tag being electrically coupled to the reader.

According to other embodiments, the method may also include changing the flag value in response to a select command from the RFID reader or changing the flag value if a bit string in the select command matches a bit string in the tag and not changing the flag value otherwise. The method may further include participating in the inventory round if the tag is queried by the reader according to its flag and the tag is not prevented from participating and maintaining a flag value until tag power is removed or the end of a predefined period.

According to further embodiments, the flag value may be changed if a bit string in a select command received from the reader matches a bit string in the tag, and not changed the flag value otherwise. The tag may then participate in the inventory round if it is queried by the reader according to its flag and the tag is not prevented from participating. A tag with a plurality of tags may provide a requested identifier to the reader in response to a query if the tag is in the private state or the tag is in the public state and one or more of the flags having the first value are specified by the query. Alternatively, the tag may generate an identifier and provide the generated identifier in place of the requested identifier in response to the query if the tag is prevented from providing an actual identifier.

The generated identifier may include a random number, a scrambled memory content, a portion of an Electronic Product Code (EPC), a portion of a tag identifier (TID), and/or a portion of a memory content. The tag may be placed into one of a plurality of public states and each of the public states may be associated with one from the set of generated identifiers. Embodiments may also include an Integrated Circuit (IC) for an RFID tag or the tag itself.

Embodiments also include methods. Some are methods of operation of an RFID tag or an RFID tag chip. These methods can be implemented in any number of ways, including the structures described in this document. One such way is by machine operations, of devices of the type described in this document.

Another optional way of implementing these methods is for one or more of the individual operations of the methods to be performed in conjunction with one or more human operators performing some of them. These operators need not be collocated with each other, but each can be with a machine that performs a portion of a program or operation.

Figure 13:
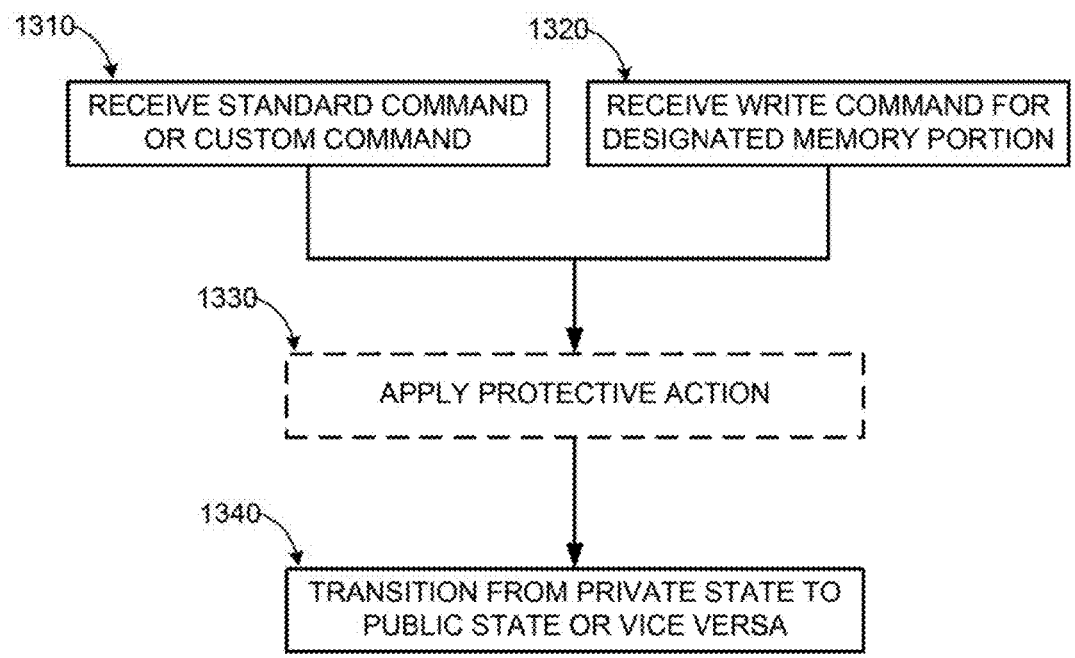
FIG. 13 is a flowchart for a process of an RFID tag transitioning from a private to a public state or vice versa according to embodiments.

FIG. 13 is a flowchart for a process of an RFID tag transitioning from a private to a public state, or vice versa, according to embodiments.

Process 1300 begins with one of alternative operations 1310 and 1320, where a tag receives either a standard or custom command, or a write command that writes directly to a portion of tag memory. A tag will typically have already been inventoried and uniquely identified by a reader prior to receiving one of these commands, but unique identification is not strictly necessary.

At optional operation 1330, the tag may employ a protective action to prevent rogue readers from improperly causing the tag to change state. For example, the tag may require receiving a password or a security code. Other security measures may include only performing one of the aforementioned commands when the reader is in close proximity to the tag, or is in direct physical contact with the tag, or any of a variety of security measures as is well known to those skilled in the art.

At operation 1340, the tag executes the aforementioned command and transitions from a private state to a public state or from a public state to a private state.

Figure 14:
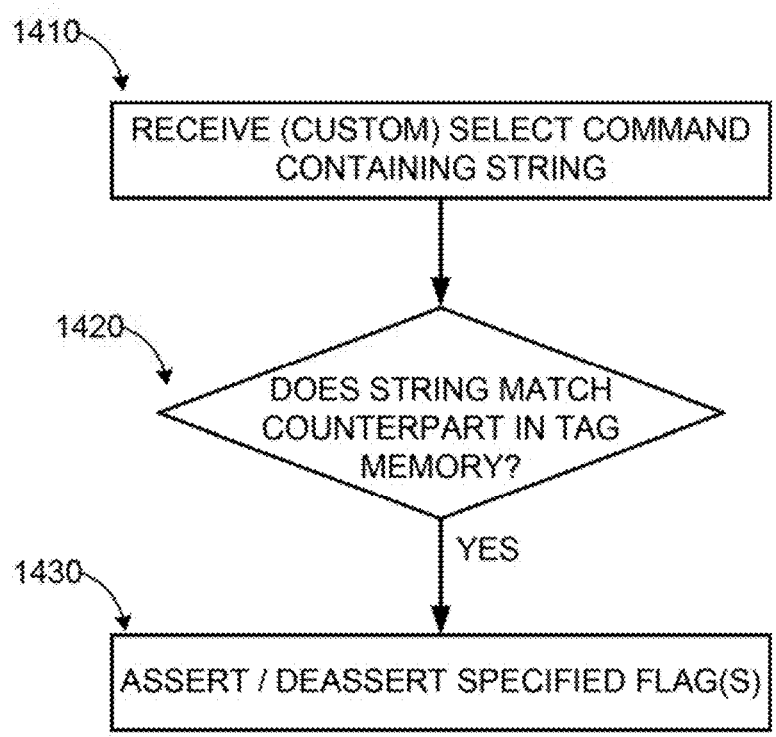
FIG. 14 is a flowchart for a process of an RFID tag asserting or deasserting its flag(s) according to embodiments.

FIG. 14 is a flowchart for a process of an RFID tag asserting or deasserting a flag or flag(s) in response to a Select (or custom Select) command after verifying that the command includes a valid string (i.e. the reader authenticates itself to the tag), according to embodiments. The string may be part or all of Reserved memory, EPC memory, TID memory, and/or user memory as in FIG. 8.

Process 1400 begins with operation 1410, where the tag receives a Select command, a custom Select command, or another custom command attempting to modify one or more of the tag's flags. As a security measure the command may include a string, such as a code, which the tag compares to a stored memory content and verifies that the reader "knows" the tag and is therefore authentic. The received command typically includes other information such as a memory-bank indicator, a memory-address pointer, a string length, an error-check code, and other such data, although these latter items are not strictly necessary.

At decision operation 1420, the tag makes a decision as to whether the string matches the stored memory content and, if there is a match, the tag may assert or deassert the specified flag(s) at operation 1430. The tag may enforce state-dependent rules on string length, for example allowing a 1-bit string in the private state where the environment is often secure, and longer strings when the tag is in the public state. If the string does not match then the tag will not modify the specified flag(s), and may even take further protective action such as increasing the string length required to form a match.

Figure 15:
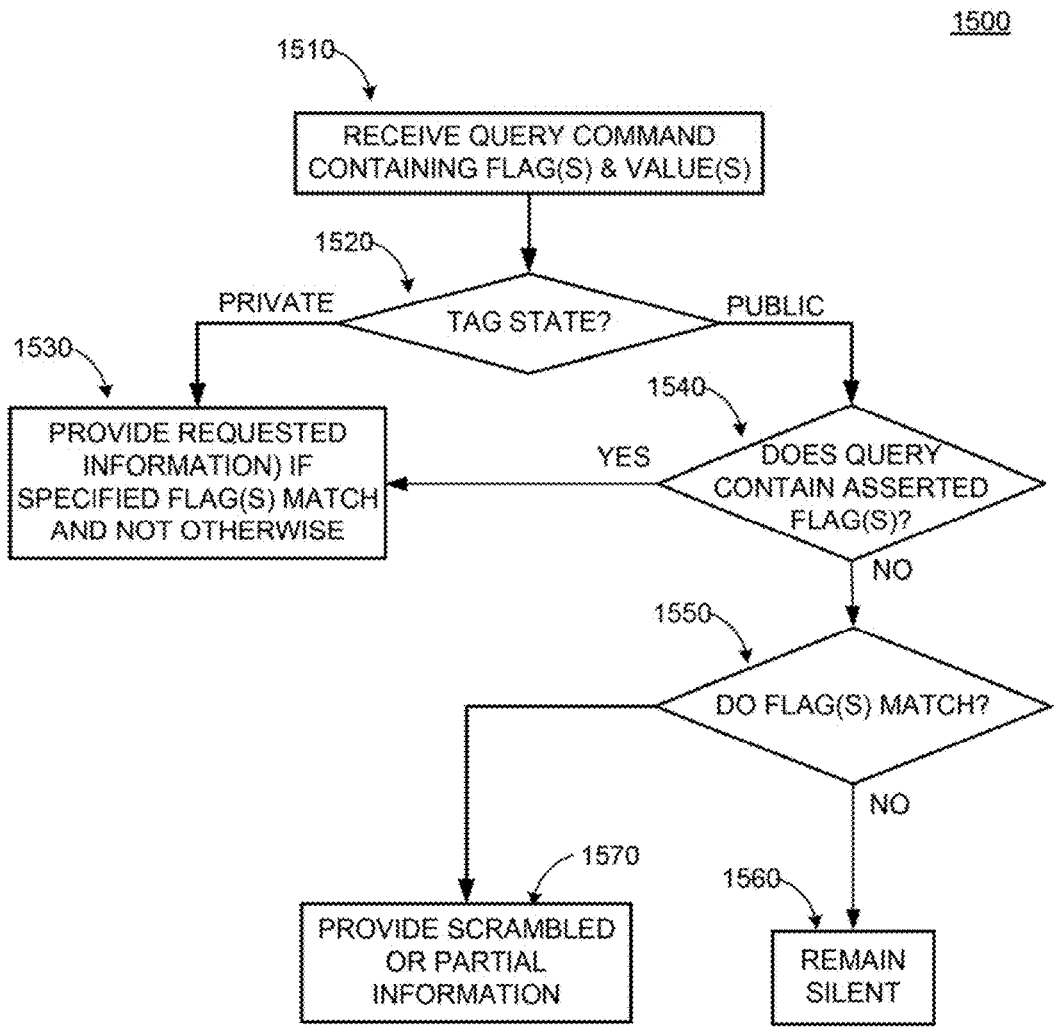
FIG. 15 is a flowchart for a process of an RFID tag behavior during an inventory round based on tag flag value(s) and tag state according to embodiments.

FIG. 15 is a flowchart for a process of an RFID tag behavior during an inventory round based on tag flag(s) and tag state according to embodiments.

Process 1500 begins with operation 1510, where the tag receives a Query command from a reader specifying one or more flags and their associated values. At decision operation 1520, the tag determines whether it is in a private or a public state.

If the tag is in a private state then it may participate in an inventory round at operation 1530 and provide the requested information, such as its actual identifier, to the reader. As described above, the tag decides whether to participate in the inventory round based on whether its flag value(s) match those specified in the Query. If they match then the tag participates. If they do not match then the tag does not participate and remains silent.

If the tag is in a public state then the tag determines at decision operation 1540 whether the Query contains asserted flag(s). If the Query contains asserted flags then the tag transitions to operation 1530 and may participate in an inventory round and provide the requested information, such as its actual identifier, to the reader. As described above, the tag decides whether to participate based on whether its flag value(s) match those specified in the Query. If they match then the tag participates. If they don't match then the tag does not participate and remains silent.

If, at decision operation 1540 the tag determines that the Query does not contain asserted flag(s) then the tag transitions to decision operation 1550, where the tag determines if the flag(s) specified in the Query command match those on the tag. In the event of a match, the tag transitions to operation 1570 and either remains silent, provides scrambled information, or provides partial information depending on the tag type and its public-state type, as described in conjunction with diagram 1200 of FIG. 12. In the event of a mismatch the tag transitions to operation 1560 and remains silent.

The operations described in processes 1300-1500 are for illustration purposes only. A tag according to embodiments may transition between private and public states in different manners or by different paths, assert or deassert flag(s) by different means, make different determinations as to how to respond as a function of state and flag matching/mismatching, and respond to queries from a reader in other ways employing additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented (such as by tags according to embodiments formed) individually and/or collectively, by a wide range of hardware, software, firmware, or virtually any combination thereof. Those skilled in the art will recognize that some aspects of the RFID tag embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, readers, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) integrated circuit (IC) to restrict its participation in an inventory round, the method comprising:
   when the IC is in a public state:
      receiving, from a first reader, a first inventorying command initiating a first inventory round;
      if the first reader is authenticated then participating in the first inventory round, else not participating in the first inventory round;
   when the IC is in a private state:
      receiving, from a second reader, a second inventorying command initiating a second inventory round; and
      participating in the second inventory round regardless of whether the second reader is authenticated;
   receiving, from a third reader, a third command requesting the IC to transition between the public and private states; and
   if the third reader is authenticated then transitioning between the public and private states, else not transitioning between the public and private states.

2. The method of claim 1, further comprising, when the IC is in the private state after having previously been in the public state, transitioning to the public state after one or more of a time delay and a removal of tag power.

3. The method of claim 1, further comprising, when the IC is in the public state, authenticating the first reader by at least one of determining whether a password received from the first reader is valid and determining whether a string received from the first reader corresponds to a string stored on the IC.

4. The method of claim 3, further comprising authenticating the first reader if the string received from the first reader satisfies a minimum string length for matching the string stored on the IC.

5. The method of claim 1, further comprising, if the first reader is authenticated:
   asserting an IC flag; and
   determining whether to participate in subsequent inventory rounds based on whether the IC flag is asserted.

6. The method of claim 5, further comprising deasserting the IC flag after one or more of a time delay, a removal of tag power, and a completion of a tag-reader dialog.

7. The method of claim 1, further comprising transitioning between the public and private states if:
   the third reader is authenticated, and
   the third reader is at least one of in close proximity to the tag and electrically coupled to the tag.

8. A method for a Radio Frequency Identification (RFID) integrated circuit (IC) to restrict access to IC information, the method comprising:
   when the IC is in a public state:
      receiving, from a first reader, a first inventorying command requesting IC information;
      if the first reader is authenticated then responding with the IC information, else not responding with the IC information;
   when the IC is in a private state:
      receiving, from a second reader, a second inventorying command requesting the IC information; and
      responding with the IC information regardless of whether the second reader is authenticated;
   receiving, from a third reader, a third command requesting the IC to transition between the public and private states; and
   if the third reader is authenticated then transitioning between the public and private states, else not transitioning between the public and private states.

9. The method of claim 8, further comprising, when the IC is in the private state after having previously been in the public state, transitioning to the public state after one or more of a time delay and a removal of tag power.

10. The method of claim 8, further comprising, when the IC is in the public state, authenticating the first reader by at least one of determining whether a password received from the first reader is valid and determining whether a string received from the first reader corresponds to a string stored on the IC.

11. The method of claim 10, further comprising authenticating the first reader if the string received from the first reader satisfies a minimum string length for matching the string stored on the IC.

12. The method of claim 8, wherein not responding with the IC information comprises one of:
   remaining silent; and
   responding with random, scrambled, encrypted or partial tag information.

13. The method of claim 8, further comprising, if the first reader is authenticated:
   asserting an IC flag; and
   determining whether to respond to subsequent commands with the IC information based on whether the IC flag is asserted.

14. The method of claim 13, further comprising deasserting the IC flag after one or more of a time delay, a removal of tag power, and a completion of a tag-reader dialog.

15. The method of claim 8, further comprising transitioning between the public and private states if:
the third reader is authenticated, and
the third reader is at least one of in close proximity to the tag and electrically coupled to the tag.

16. A method for a Radio Frequency Identification (RFID) integrated circuit (IC) to restrict its participation in an inventory round, the method comprising:
when the IC is in a private state:
receiving, from a first reader, a first inventorying command initiating a first inventory round;
participating in the first inventory round regardless of whether the first reader is authenticated;
receiving, from a second reader, a transaction code; and writing the transaction code into IC memory;
receiving, from a third reader, a transition command requesting the IC to transition from the private state to a public state;
if the third reader is authenticated then transitioning to the public state, else not transitioning to the public state; and
when the IC is in the public state:
receiving, from a fourth reader, authenticating information;
receiving, from a fifth reader, a second inventorying command initiating a second inventory round; and
participating in the second inventorying round if the authenticating information corresponds to the stored transaction code, else not participating in the second inventory round.

17. The method of claim 16, wherein the second and third readers are the same reader.

18. The method of claim 16, further comprising, when the IC is in the private state after having previously been in the public state, transitioning to the public state after one or more of a time delay and a removal of tag power.

19. The method of claim 16, further comprising, in the public state, if the authenticating information corresponds to the stored transaction code:
asserting an IC flag; and
determining whether to participate in subsequent inventory rounds based on whether the IC flag is asserted.

20. The method of claim 19, further comprising deasserting the IC flag after one or more of a time delay, a removal of tag power, and a completion of a tag-reader dialog.

* * * * *